(12) United States Patent
Imahara et al.

(10) Patent No.: US 8,818,774 B2
(45) Date of Patent: Aug. 26, 2014

(54) BEHAVIORAL MODEL GENERATING DEVICE AND METHOD THEREFOR

(71) Applicant: Kabushiki Kaisha Toshiba, Minato-ku (JP)

(72) Inventors: Shuichiro Imahara, Kawasaki (JP); Kazuto Kubota, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 13/804,961

(22) Filed: Mar. 14, 2013

(65) Prior Publication Data

US 2013/0253890 A1    Sep. 26, 2013

Related U.S. Application Data

(63) Continuation of application No. PCT/JP2013/056883, filed on Mar. 6, 2013.

(30) Foreign Application Priority Data

Mar. 22, 2012 (JP) ................................. 2012-066113

(51) Int. Cl.
*G06G 7/48* (2006.01)
(52) U.S. Cl.
USPC ............................................................. 703/6
(58) Field of Classification Search
USPC ................................................................ 703/6
See application file for complete search history.

(56) References Cited

U.S. PATENT DOCUMENTS

2012/0078593 A1 * 3/2012 Kubota et al. .................. 703/2

FOREIGN PATENT DOCUMENTS

| JP | 2002-304443 | 10/2002 |
|---|---|---|
| JP | 2007-3296 | 1/2007 |
| JP | 2008-15921 | 1/2008 |
| JP | 2008-250912 | 10/2008 |
| JP | 2010-166636 A | 7/2010 |
| JP | 2012-065468 A | 3/2012 |

OTHER PUBLICATIONS

International Search Report and the Written Opinion of the International Searing Authority issued May 28, 2013, in International Application No. PCT/JP2013/056883, 9 pages.

* cited by examiner

*Primary Examiner* — Hugh Jones
(74) *Attorney, Agent, or Firm* — Oblon, Spivak, McClelland, Maier & Neustadt, L.L.P.

(57) ABSTRACT

There is provided a behavioral model generating device in which a first pattern generator selects behavioral patterns from all the behavioral patterns in behavioral pattern groups by duplicate sampling according to a weighting factor of each group, and adds modification to each pattern to generate first behavioral patterns, a second pattern generator generates device operation patterns from the first behavioral patterns, a power consumption calculator calculates power consumption data based on the device operation patterns, an evaluation selector selects behavioral patterns from the first behavioral patterns by duplicate sampling according to a likelihood of the calculated power consumption data with respect to measured power consumption data, a first updater merges a pair of most similar groups out of all the groups including a group of the selected behavioral patterns and sets a weighting factor of the merged group as a sum of respective weighting factors of the pair.

13 Claims, 24 Drawing Sheets

EXAMPLE OF CONTINUOUS MARKOV MODEL

EXAMPLE OF BEHAVIORAL MODEL

| GROUP ID | BEHAVIORAL PATTERN (G GROUPS × P = GP) | DUPLICATION FREQUENCY |
|---|---|---|
| 1 | (patterns with COOKING events) ... | 1 |
| ... | ... | |
| G | (patterns with COOKING events) ... | 1 |

EXAMPLE OF BEHAVIORAL PATTERN

EXAMPLE OF DEVICE OPERATION PATTERN GENERATION PROCESSING

EXAMPLE OF DEVICE OPERATION MODEL (CASE OF COOKING)

| COOKING ACTION | MIDNIGHT | MORNING | NOON | NIGHT |
|---|---|---|---|---|
| IH | 0 MIN | 20 MIN | 0 MIN | 30 MIN |
| MICROWAVE OVEN | 0 MIN | 10 MIN | 10 MIN | 20 MIN |
| ... | ... | ... | ... | ... |

EXAMPLE OF DEVICE POWER CONSUMPTION MODEL

| DEVICE | DEVICE POWER CONSUMPTION MODEL |
|---|---|
| LIVING ROOM AIR CONDITIONING | AIR CONDITIONING TYPE |
| LIVING ROOM TV | MODE TYPE |
| ... | ... |
| WASHER/DRYER | MODE TYPE |

EXAMPLE OF LIKELIHOOD FUNCTION $$L = \prod_t N(S_t - W_t)$$

N(x) : NORMAL DISTRIBUTION FUNCTION
$S_t$ : TOTAL POWER CONSUMPTION AT CALCULATED TIME t
$W_t$ : TOTAL POWER CONSUMPTION AT MEASURED TIME t

EXAMPLE OF BEHAVIORAL PATTERN GROUP

FIG. 17

EXAMPLE OF DEVICE SORT

| DEVICE | DEVICE SORT |
|---|---|
| 1 | WASHER/DRYER |
| 2 | REFRIGERATOR |
| 3 | AIR CONDITIONER |
| ... | ... |

EXAMPLE OF DEVICE POWER CONSUMPTION HISTORY

EXAMPLE OF DEVICE TYPE CONVERSION TABLE

| DEVICE SORT | WAVEFORM TYPE |
|---|---|
| WASHER/DRYER | MODE TYPE (ON/OFF) |
| REFRIGERATOR | MODE TYPE (REGULAR ON) |
| AIR CONDITIONER | AIR CONDITIONING TYPE |
| ... | ... |

EXAMPLE OF POWER CONSUMPTION CALCULATION MODEL (IN COOLING OPERATION)

CHANGE AMOUNT IN DIFFERENCE BETWEEN ROOM TEMPERAURE AND PRESET TEMPERATURE

| DIFFERENCE BETWEEN ROOM TEMPERATURE AND PRESET TEMPERATURE | -1°C | 0°C | +1°C | ... |
|---|---|---|---|---|
| 0°C | 0W | 100W | 200W | ... |
| 1°C | 100W | 200W | 300W | ... |
| 2°C | 200W | 300W | 400W | ... |
| ... | ... | ... | ... | ... |

FIG. 28

EXAMPLE OF ROOM-TEMPERATURE CHANGE CALCULATION MODEL (IN COOLING OPERATION)

DIFFERENCE BETWEEN OUTDOOR TEMPERATURE AND ROOM TEMPERATURE

| POWER CONSUMPTION | -1°C | 0°C | +1°C | ... |
|---|---|---|---|---|
| 0W | -0.1°C/MIN | 0.0°C/MIN | +0.1°C/MIN | ... |
| 100W | -1.1°C/MIN | -1.0°C/MIN | -0.9°C/MIN | ... |
| 200W | -2.1°C/MIN | -2.0°C/MIN | -1.9°C/MIN | ... |
| ... | ... | ... | ... | ... |

FIG. 29

$$L = \prod_t \left\{ N(S_t - W_t) \prod_{i \in \text{MEASURING DEVICE}} N(Q_{it} - V_{it}) \right\}$$

$N(x)$ : NORMAL DISTRIBUTION FUNCTION
$S_t$ : TOTAL POWER CONSUMPTION AT CALCULATED TIME t
 (EXCLUDING POWER CONSUMPTION DERIVING FROM MEASURING DEVICE)
$W_t$ : TOTAL POWER CONSUMPTION AT MEASURED TIME t-SUM
 OF MEASURED DEVICE POWER CONSUMPTION
$Q_{it}$ : CALCULATED POWER CONSUMPTION OF DEVICE i AT TIME t
 (MEASURING DEVICE ONLY)
$V_{it}$ : MEASURED POWER CONSUMPTION OF DEVICE i AT TIME t
 (MEASURING DEVICE ONLY)

FIG. 32

BEHAVIORAL MODEL GENERATING DEVICE AND METHOD THEREFOR

CROSS REFERENCE TO RELATED APPLICATIONS

This application is a continuation of International Application No. PCT/JP2013/056883, filed on Mar. 6, 2013, the entire contents of which is hereby incorporated by reference. This application also claims the benefit of priority from Japanese Patent Application No. 2012-066113, filed on Mar. 22, 2012.

TECHNICAL FIELD

Embodiments relates to a behavioral model generating device and a method therefor.

BACKGROUND ART

As computerization of electric power infrastructure is being promoted, real-time measurement of electric power consumption in every household by placement of a smart meter is now coming into reality. A demand response, which is to pay incentives to customers for promoting reduction in power demand, is now attracting attention as new service using the infrastructure. To predict the amount of demand reduction in relation to the incentive to be paid, it is important to construct a model relating to behavior and device use by consumers.

As a method for calculating power consumption based on a consumer behavior model, there is conventionally known a method in which a device operation sequence is generated based on a behavior sequence, and power consumption is calculated based on the device operation sequence.

According to the above method for calculating power consumption based on the behavior model, a calculation result could deviate from actual power consumption data, which necessitates collection of information on consumer behavior through questionnaire survey and the like to improve precision.

DISCLOSURE OF THE INVENTION

According to some embodiments, there is provided a behavioral model generating device, including; a model storage, a first pattern generator, a second pattern generator, a power consumption calculator, a first storage, an evaluation selector, and a first updater.

The model storage stores a plurality of behavioral pattern groups and weighting factors set for the behavioral pattern groups, the behavioral pattern groups each including a plurality of behavioral patterns that indicate consumer actions placed along with time.

The first pattern generator selects, according to the weighting factors, a plurality of behavioral patterns from all the behavioral patterns included in the behavioral pattern groups by duplicate sampling, and adds modification to each of selected behavioral patterns to generate a plurality of first behavioral patterns;

The second pattern generator generates, based on the first behavioral patterns, device operation patterns that indicate device operations placed along with time according to a device operation model that defines correspondence between actions and device operations.

The power consumption calculator calculates power consumption data for each of the device operation patterns, which indicate temporal transition of power consumption according to a device power consumption model that defines correspondence between device operations and power consumption.

The first storage stores measured power consumption data that indicate temporal transition of power consumption by one or more devices in a consumer house.

The evaluation selector calculates a likelihood of each calculated power consumption data with respect to measured power consumption data, respectively, and selects, according to the likelihood, a plurality of behavioral patterns from the first behavioral patterns by duplicate sampling as a first behavioral pattern group.

The first updater selects a pair of most similar behavioral pattern groups from all the behavioral pattern groups including the first behavioral pattern group, selects a part of all the behavioral patterns included in the pair as a second behavioral pattern group, updates the pair of the most similar behavioral pattern groups with the second behavioral pattern group, and sets a weighting factor of the second behavioral pattern group to a sum of respective weighting factors of the pair of the most similar behavioral pattern groups.

BRIEF DESCRIPTION OF THE DRAWINGS

FIG. 17 shows an example of an updated behavioral model;

FIG. 28 shows an example of a power consumption calculation model as a device power consumption model in the case of an air conditioning-type device;

FIG. 29 shows an example of a room-temperature change model as a device power consumption model in the case of an air conditioning-type device;

FIG. 32 shows another example of the likelihood function; and

DESCRIPTION OF EMBODIMENTS

Hereinafter, embodiments will be described hereinbelow with reference to the drawings.

Figure 1:
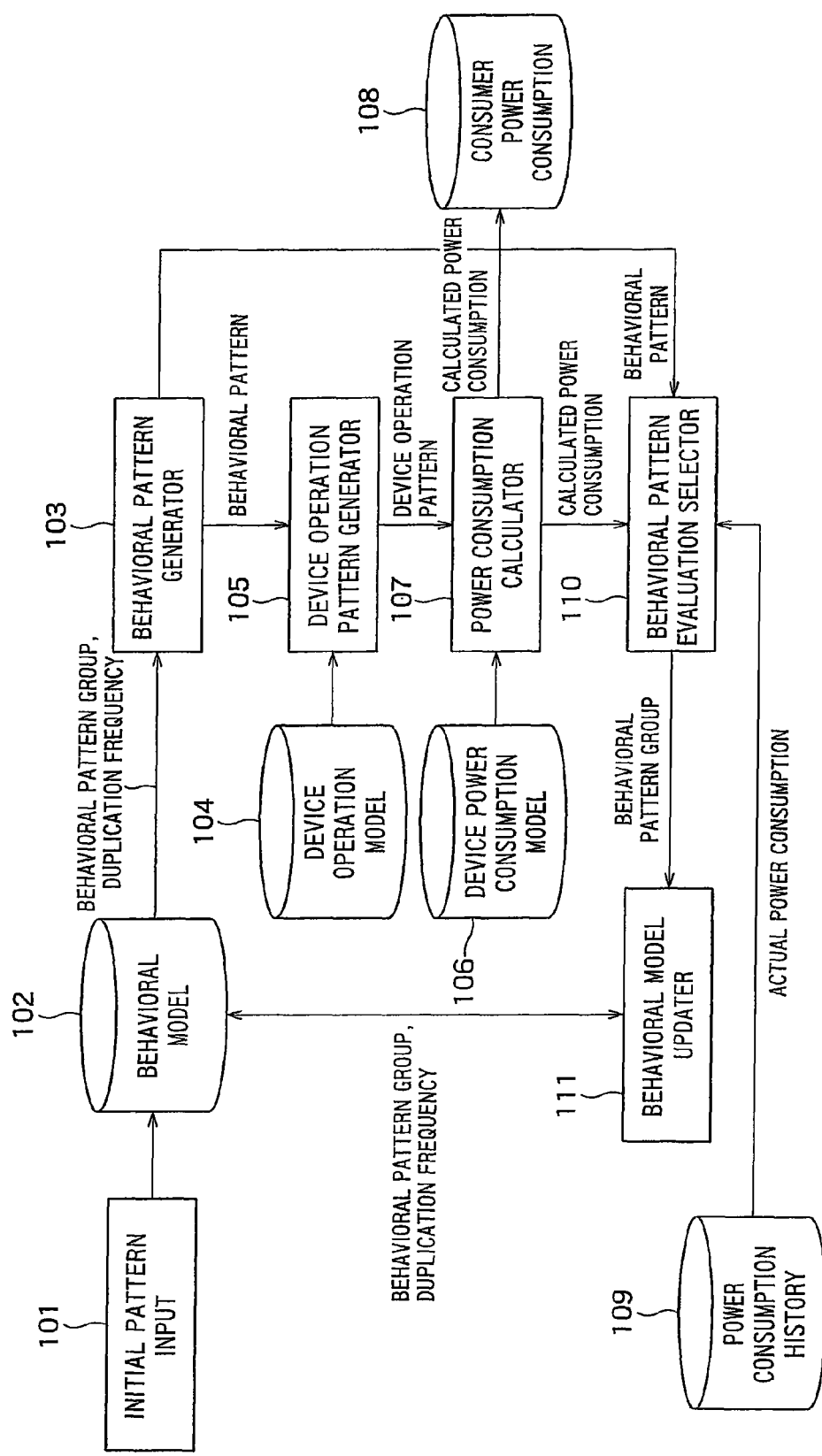
FIG. 1 shows a behavioral model generating device (consumer power consumption calculator) according to a first embodiment.

FIG. 1 shows a consumer power consumption calculator (behavioral model generating device) according to a first embodiment. The consumer power consumption calculator includes an initial pattern input unit 101, a behavioral model storage 102, a behavioral pattern generator 103, a device operation model storage 104, a device operation pattern generator 105, a device power consumption model storage 106, a power consumption calculator 107, a consumer power consumption storage 108, a power consumption history storage 109, a behavioral pattern evaluation selector 110 and a behavioral model updater 111. This calculator may be installed in each household or may be mounted on a cloud server.

The outline of each unit will be described first, and detailed operation will be described thereafter.

The initial pattern input unit 101 is to input initial patterns of a behavioral model. As the initial patterns, results of a questionnaire survey collected from residents may be inputted, or statistical information from surveys such as NHK National Time Use Survey may be inputted.

The behavioral model storage 102 stores "G" pairs of a behavioral pattern group including a distribution of a plurality of behavioral patterns and a duplication frequency (weighting factor) indicating a occurrence frequency of the behavioral pattern group. These pairs correspond to a behavioral model. Each behavioral pattern group holds a distribution of past behavioral patterns as a set of realized values of "P" behavioral patterns. One behavioral pattern group includes behavioral patterns similar to each other. The behavioral models are used in the behavioral pattern generator 103. A behavioral pattern consists of one or more actions placed along a time axis (for example, 24 hours).

Figures 4, 5:
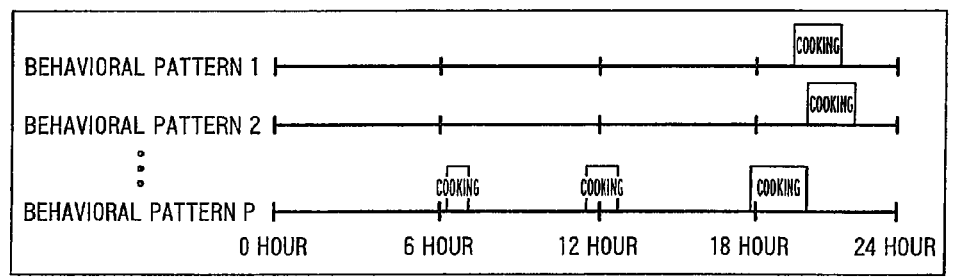
FIG. 4 shows an example of a behavioral model.
FIG. 5 shows one example of "S" behavioral patterns generated in the behavioral pattern generator.

FIG. 4 shows an example of the behavioral model stored in the behavioral model storage 102. The length of one behavioral pattern corresponds to, for example, 24 hours. For easier understanding, one behavioral pattern includes only "cooking" action placed therein. In actuality, however, a plurality of actions such as TV viewing, doing the laundry, and reading are placed therein.

It is to be noted that "G" behavioral pattern groups do not necessarily need to be stored, but at least one behavioral pattern group should be included at first. As described later, the number of behavioral pattern groups increases to "G" by update, and "G" behavioral pattern groups are then maintained by integrating processing. It is to be noted that the value "G" is determined based on restrictions of memory capacity and the like.

The behavioral pattern generator 103 reads a behavioral model stored in the behavioral model storage 102, and performs duplicate sampling in each group to obtain total "S (≥P)" behavioral patterns with use of a duplication frequency given to each group as a weight. Noise is then added to respective sampled behavioral patterns to generate new behavioral patterns (first behavioral patterns). Noise may be added in order to, for example, change the position or time length of an action included in the behavioral pattern and to add, change and delete actions. The generated behavioral patterns are used in the device operation pattern generator 105 and the behavioral pattern evaluation selector 110.

The device operation model storage 104 stores a device operation model to generate, based on the behavioral patterns generated in the behavioral pattern generator 103, a device operation pattern such as ON/OFF operation of each device. The device operation model is used in the device operation pattern generator 105.

Figures 6, 7:
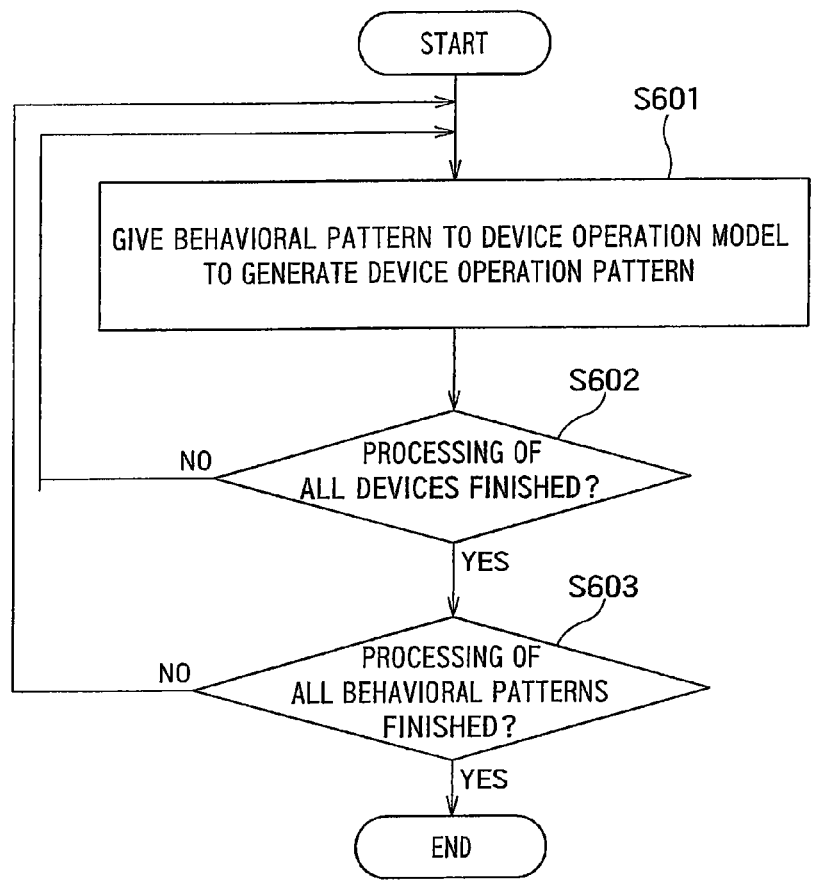
FIG. 6 shows one example of processing procedures in a device operation pattern generator.
FIG. 7 shows one example of a device operation model.

FIG. 7 shows an example of the device operation model stored in the device operation model 104. In the drawing, an example of the device operation model for cooking action is presented. In a cooking time zone of noon, use time of an IH is 0 min and use time of a microwave oven is 10 min.

The device operation pattern generator 105 generates a device operation pattern based on the behavioral patterns generated in the behavioral pattern generator 103 and the device operation model. In short, the behavioral pattern having actions placed along with a time axis is converted into a device operation pattern (not shown) having device motions (device operations) placed along with a time axis. The generated device operation pattern is used in the power consumption calculator 107. A method for using the device operation model will be described later.

The device power consumption model storage 106 stores a device power consumption model to calculate power consumption of each device based on the device operation pattern. The device power consumption model 106 is used in the power consumption calculator 107. FIGS. 9, 26, 28 and 29 show examples of the device power consumption model stored in the device power consumption model storage 106. The details thereof will be described later.

The power consumption calculator 107 calculates transition of power consumption based on the device operation pattern generated in the device operation pattern generator 105 and the device power consumption model. Calculated power consumption data is stored in the consumer power consumption DB 108 and is sent to the behavioral pattern evaluation selector 110.

The consumer power consumption storage 108 stores the power consumption data calculated in the power consumption calculator 107. The stored power consumption data may be used for power consumption prediction, device control planning and the like. Since a concrete method for using the data is out of the gist of the embodiment, a description thereof will be omitted. As one aspect of a method for using the behavioral model 102, it is also possible to generate a device operation pattern based on the behavioral patterns obtained by duplicate sampling in the behavioral pattern generator 103 without giving noise thereto, to perform power consumption calculation based on the generated device operation pattern, and to store it in the consumer power consumption storage 108.

The power consumption history storage 109 stores actual power consumption data of an entire residence measured with a power sensor and the like. The measured power consumption data is used in the behavioral pattern evaluation selector 110.

The behavioral pattern evaluation selector 110 selects "P" behavioral patterns from the behavioral patterns generated in the behavioral pattern generator 103 by duplicate sampling according to a similarity degree between the power consumption data calculated in the power consumption calculator 107 and the actual power consumption data stored in the power consumption history 109, and generates a behavioral pattern group. The generated behavioral pattern group is used in the behavioral model updater 111.

If the sum of the behavioral pattern groups including the behavioral pattern group generated in the behavioral pattern evaluation selector 110 and the respective behavioral pattern groups included in the behavioral model storage 102 is "G+1", the behavioral model updater 111 selects a pair of most similar behavioral pattern groups out of these behavioral pattern groups and merges them to maintain the number of the behavioral pattern groups "G". A duplication frequency thereof is obtained by adding the respective duplication frequency values of these merged behavioral pattern groups. The duplication frequency of a behavioral pattern group generated in the behavioral pattern evaluation selector 110 is set to 1. Thus, "G" behavioral pattern groups are maintained in the behavioral model storage 102. When the total number of the behavioral pattern groups is "G" or less, the behavioral pattern groups generated in the behavioral pattern evaluation selector 110 are added to the behavioral model storage 102 without being merged. In this case, the duplication frequency thereof is set to 1.

Figure 18:
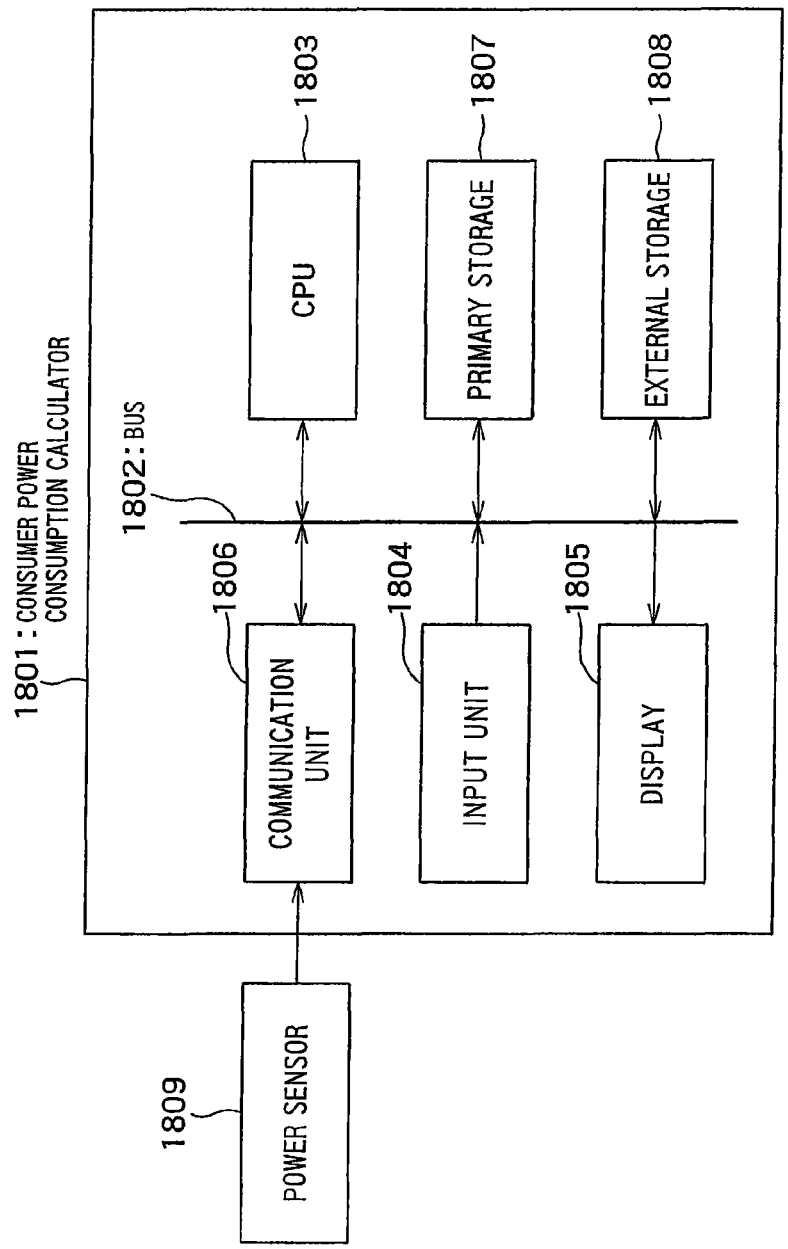
FIG. 18 shows a hardware configuration example of the consumer power consumption calculator.

FIG. 18 shows a hardware configuration example of the consumer power consumption calculator. The consumer power consumption calculator is implemented by using a built-in computer apparatus as basic hardware. The built-in computer apparatus includes, as shown in FIG. 18, a CPU 1803, an input unit 1804, a display 1805, a communication unit 1806, a primary storage 1807, and an external storage 1808. These units are connected via a bus 1802 so as to be able to communicate with each other.

The input unit 1804 includes an input device such as a keyboard and a mouse, and outputs a manipulate signal by manipulation of the input device to a CPU 1508.

The display 1805 is made of a display, such as an LCD Liquid Crystal Display) and a CRT (Cathode Ray Tube).

The communication unit 1806 has a communication means, such as Ethernet (registered trademark), wireless LAN (Local Area Network), Bluetooth (registered trademark), and ZigBee (registered trademark) to communicate with a power sensor 1809.

The external storage 1808 is made of, for example, a hard disk or a storage medium, such as a CD-R, a CD-RW, a DVD-RAM, and a DVD-R to store a control program for making the CPU 1803 to execute processing by the initial pattern input 101, the behavioral pattern generator 103, the device operation pattern generator 105, the power consumption calculator 107, the behavioral pattern evaluation selector 110, and the behavioral model updater 111 described in the foregoing. The external storage 1808 also stores data such as the behavioral models, the device operation models, the device power consumption models, the consumer power consumption DB, and the power consumption history.

The primary storage 1807 is made of a memory and the like to expand a control program stored in the external storage 1808 under control by the CPU 1803 and to store data required for execution of the program and data produced by execution of the program. To implement the control program, the program may be pre-installed in the computer apparatus, or the program may be stored in a storage medium such as a CD-ROM or distributed through a network, and be installed in the computer apparatus appropriately.

Figure 2:
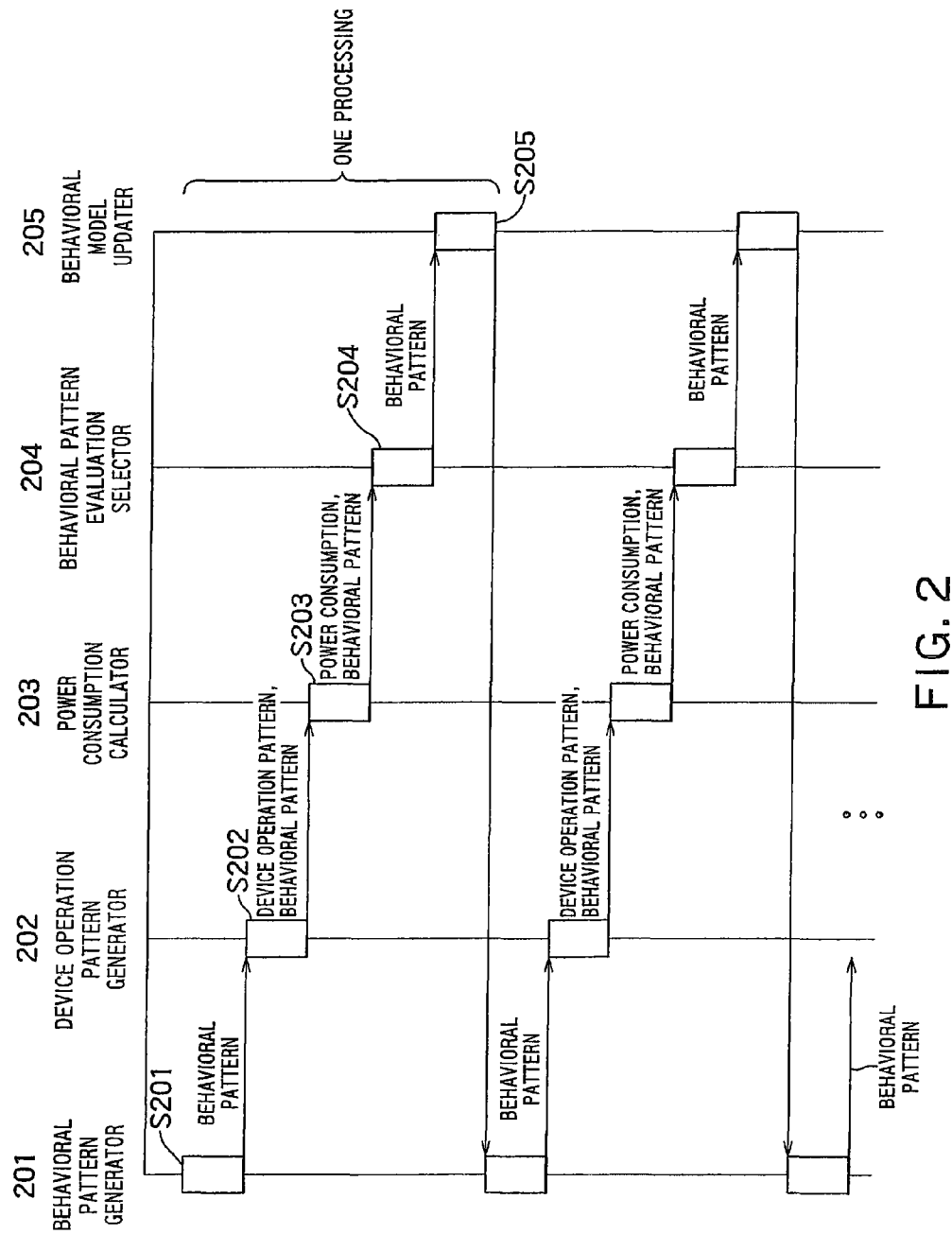
FIG. 2 shows one example of operation procedures when respective components in the consumer power consumption calculator operate in cooperation with each other.

FIG. 2 shows an example of communication procedures when a behavioral pattern generator 201, a device operation pattern generator 202, a power consumption calculator 203, a behavioral pattern evaluation selector 204, and a behavioral model updater 205 operate in cooperation with each other in a consumer power consumption calculator.

In Step S201, behavioral pattern generation processing is started periodically (for example, once a day), in which the behavioral pattern generator 201 performs duplicate sampling of "S" behavioral patterns from the behavioral model storage 102, and transmits them to the device operation pattern generator 105.

In Step S202, the device operation pattern generator 105 generates a device operation pattern(s) based on a device operation model(s) and behavioral patterns, and transmits the generated device operation pattern(s) together with the behavioral patterns to the power consumption calculator 107.

In Step S203, the power consumption calculator 107 calculates power consumption based on the device operation pattern(s) and a device power consumption model(s) and transmits the calculated power consumption data together with the behavioral patterns to the behavioral pattern evaluation selector 110. It is to be noted that the calculated power consumption data may be stored in the consumer power consumption storage 108.

In Step S204, based on a similarity (likelihood) between transition of actual power consumption and transition of the calculated power consumption, the behavioral pattern evaluation selector 204 performs duplicate sampling of "P" behavioral patterns and transmits them as a behavioral pattern group (first behavioral pattern group) to the behavioral model updater 205.

In Step S205, based on the behavioral pattern group generated in Step S204, the behavioral model updater 205 updates the behavioral model in the behavioral model storage 102, and returns control to the behavioral pattern generator 201.

A series of flows described above is periodically repeated. According to the above procedures, consumer power consumption calculation processing of the consumer power consumption calculator is carried out.

Figure 3:
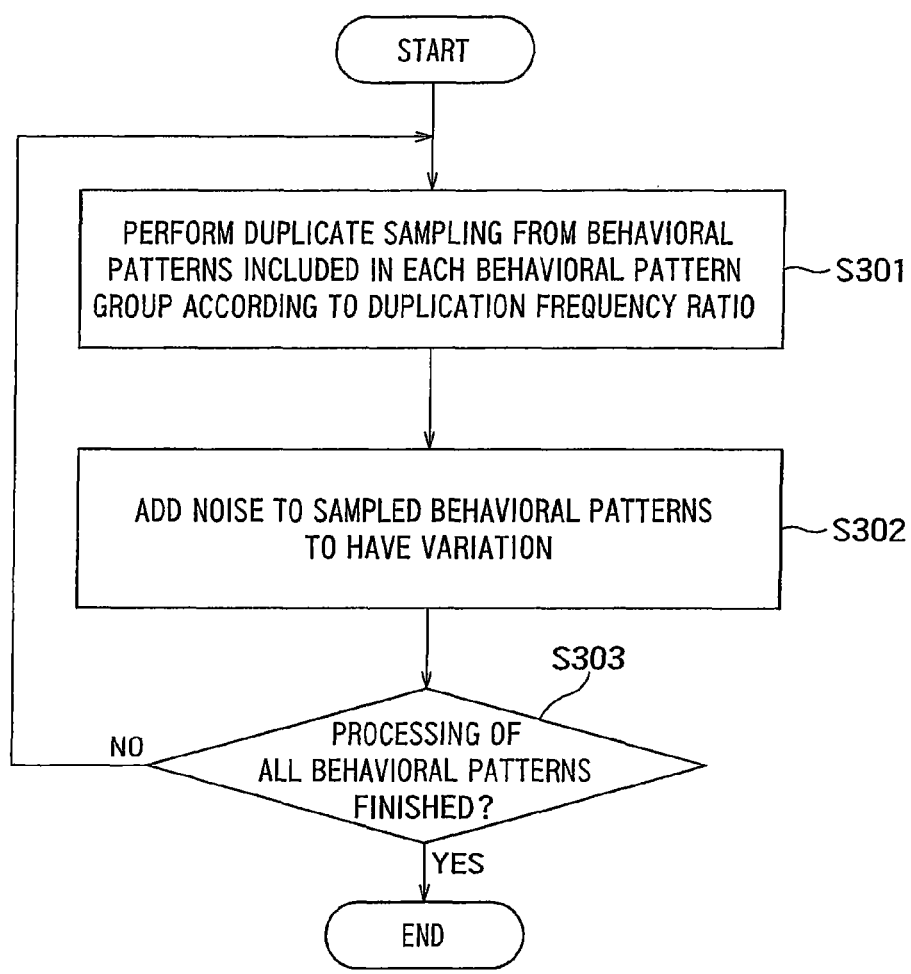
FIG. 3 shows one example of processing procedures in a behavioral pattern generator.

FIG. 3 shows one example of processing procedures in the behavioral pattern generator 103 of FIG. 1.

Upon execution of Step S201 of FIG. 2, Step S301 of FIG. 3 is executed. Assuming that "G" behavioral pattern groups are stored in the behavioral model storage 102, one pattern is first sampled from "G×P" behavioral patterns stored in the behavioral model storage 102 in Step S301. In sampling, duplicate sampling is performed with use of a duplication frequency as a weight. As the duplication frequency is larger, a probability to be selected becomes higher.

In Step S302, noise is added to the behavioral pattern generated in Step S301 to generate a new behavioral pattern.

In Step S303, the flow repeatedly returns to Step S301 to continue generation of behavioral patterns through duplicate sampling and noise addition until a prescribed number of the behavioral patterns ("S" patterns) are obtained.

"S" behavioral patterns obtained through the above duplicate sampling are a set of the behavioral patterns selected from each behavioral pattern group according to the level of each duplication frequency. FIG. 5 shows an example of "S" generated behavioral patterns. For simplification, only cooking action is illustrated in the example shown in FIG. 5, though one behavioral pattern includes actions other than the cooking action in actuality.

FIG. 6 shows one example of processing procedures in the device operation pattern generator 105 of FIG. 1.

Upon execution of Step S202 of FIG. 2, Step S601 of FIG. 6 is executed. In Step S601, a device operation pattern of one device is generated based on the behavioral patterns generated in the behavioral pattern generator 103 and a device operation model corresponding to the device.

In Step S602, the flow returns to Step S601 to repeat the processing until the device operation pattern is generated for all the devices.

In Step S603, the flow returns to Step S601 to repeat the processing until the device operation pattern is calculated for all the behavioral patterns ("S" patterns).

FIG. 7 shows an example of the device operation model for cooking action. In the drawing, the time length of each device used in cooking action is stored for every time zone. The device operation pattern generator 105 generates random numbers (normal random numbers) according to a normal distribution with use of, for example, an averaged value of the time length, and thereby determines a use time length of each device to generate device ON/OFF data. If a random number value is larger than the length of a cooking action, the random number should be regenerated.

The time to start using a device is determined by a random number based on a probability distribution given in advance. If the time obtained by adding the use time length to the start time exceeds finish time of the cooking action, the random number may be regenerated, or the time to finish using the device may be conformed to the finish time of the cooking action.

In this example, only ON/OFF operation is involved. However, in other cases such as air conditioning, the device operation pattern includes not only ON/OFF operation but also preset temperature information.

Figure 8:
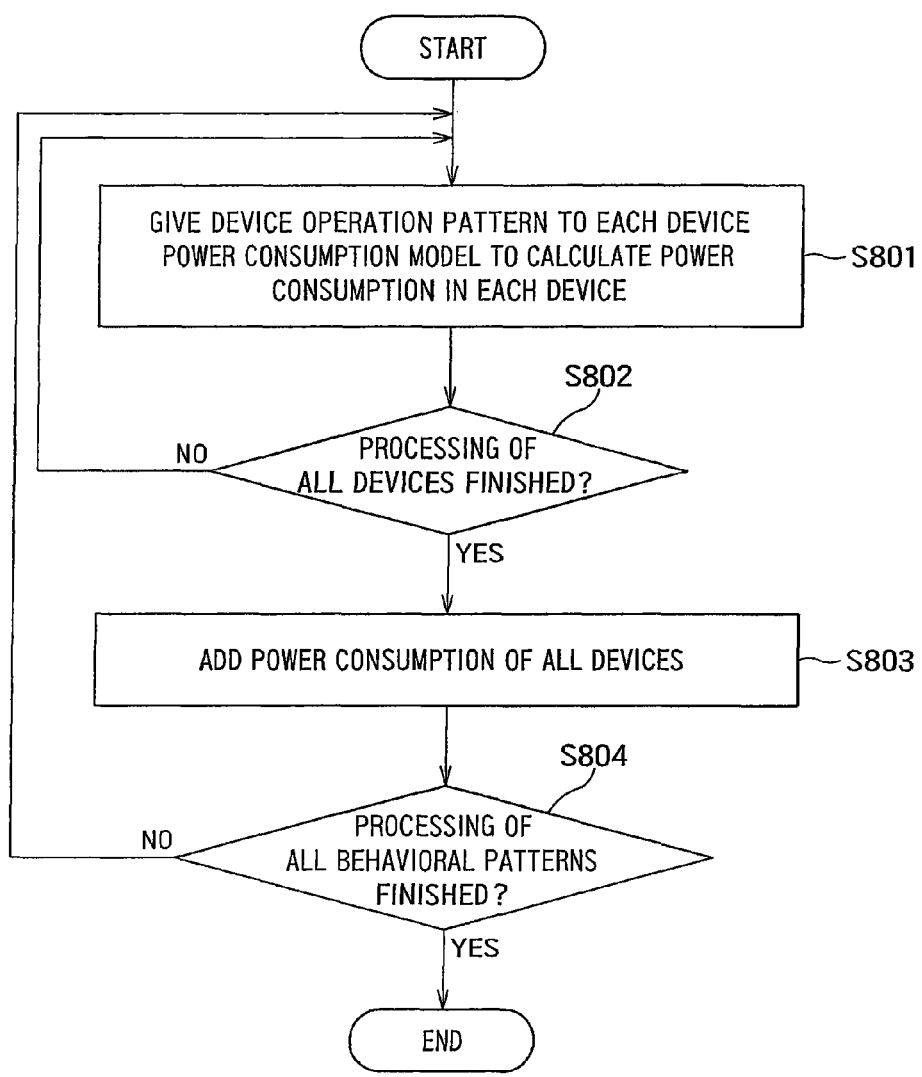
FIG. 8 shows one example of processing procedures in a power consumption calculator.

FIG. 8 shows one example of processing procedures in the power consumption calculator 107 of FIG. 1.

Upon execution of Step S203 of FIG. 2, Step S801 of FIG. 8 is executed. In Step S801, power consumption of each device is calculated based on the device operation patterns generated in the device operation pattern generator 105 and a device power consumption model(s).

FIGS. 9, 26, 28, and 29 show examples of the device power consumption model.

Figures 9, 10:
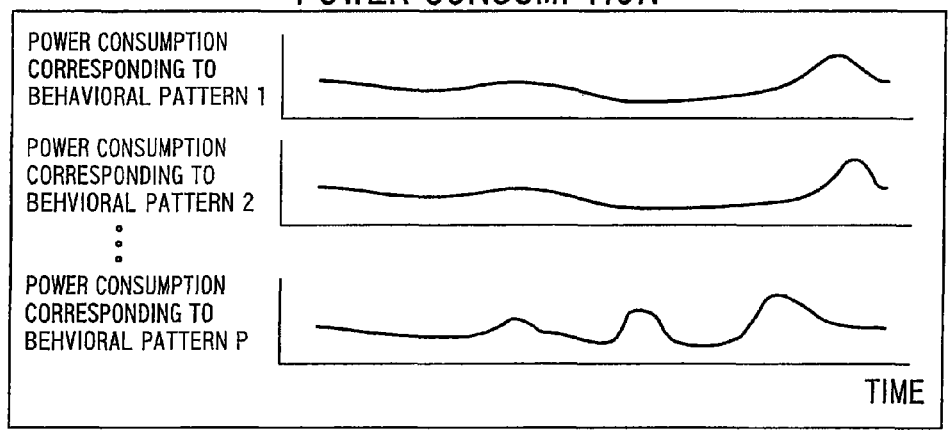
FIG. 9 shows one example of a device power consumption model.
FIG. 10 shows one example of power consumption calculated for each behavioral pattern.

As shown in FIG. 9, respective devices are classified into an air conditioning type and a mode type according to their characteristics.

Figure 26:
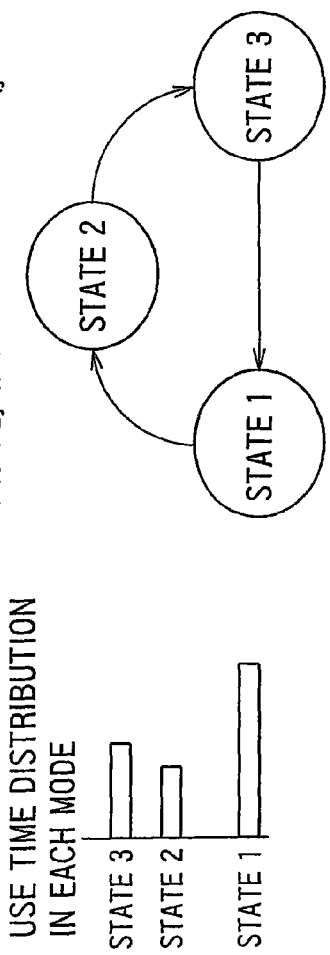
FIG. 26 shows an example of a continuous-time Markov model as a device power consumption model in the case of a mode-type device.

As for the device power consumption model for a mode-type device, information of FIG. 26 is maintained. In the mode-type device, when the device is turned ON, the flow starts in state 1 and continues to calculate power consumption during use time of the device in the order of state 2→state 3→state 1→ . . . according to a continuous-time Markov model. Power consumption is predetermined for every state. Average stay time of each state is also predetermined. After average stay time elapsed, the state shifts to the next state according to a state transition probability.

As for the device power consumption model for air conditioning-type devices, information of FIGS. 28 and 29 are maintained. In the air conditioning-type device, power consumption is calculated by repeating calculation of power consumption based on the information of FIG. 28 and calculation of change in room temperature based on the information on FIG. 29.

In the case of an air-conditioner with network connection, values of the room temperature and temperature setting in FIG. 28 are obtained from the air-conditioner via a network. The values of the room temperature may be a measurement by a sensor. Accordingly, difference between the room temperature and the preset temperature is determined. A parameter "change amount in difference between room temperature and preset temperature" in FIG. 28 refers to difference from a value one hour earlier, that is, temporal difference. Thus, power consumption can be obtained based on the information of FIG. 28. Based on the obtained power consumption and the difference between outdoor temperature and room temperature measured by a sensor, a change in room temperature is obtained with use of the information of FIG. 29. In the case of taking into consideration the device power consumption model for air conditioning-type devices and the like, outdoor temperature needs to be added as an input into the power consumption calculator. The room temperature is updated based on the obtained change in room temperature, and the updated room temperature is fed back to the power consumption calculation based on the information of FIG. 28.

In Step S802, the flow returns to Step S801 to repeat the processing until power consumption of all the devices is calculated.

In Step S803, a total sum of the power consumption by all the devices calculated in Step S801 is calculated, and transition of the power consumption is calculated.

In Step S804, the flow returns to Step S801 to repeat the processing until the transition of the power consumption is calculated for all the behavioral patterns.

FIG. 10 shows an example of the power consumption calculated for each behavioral pattern.

Figure 11:
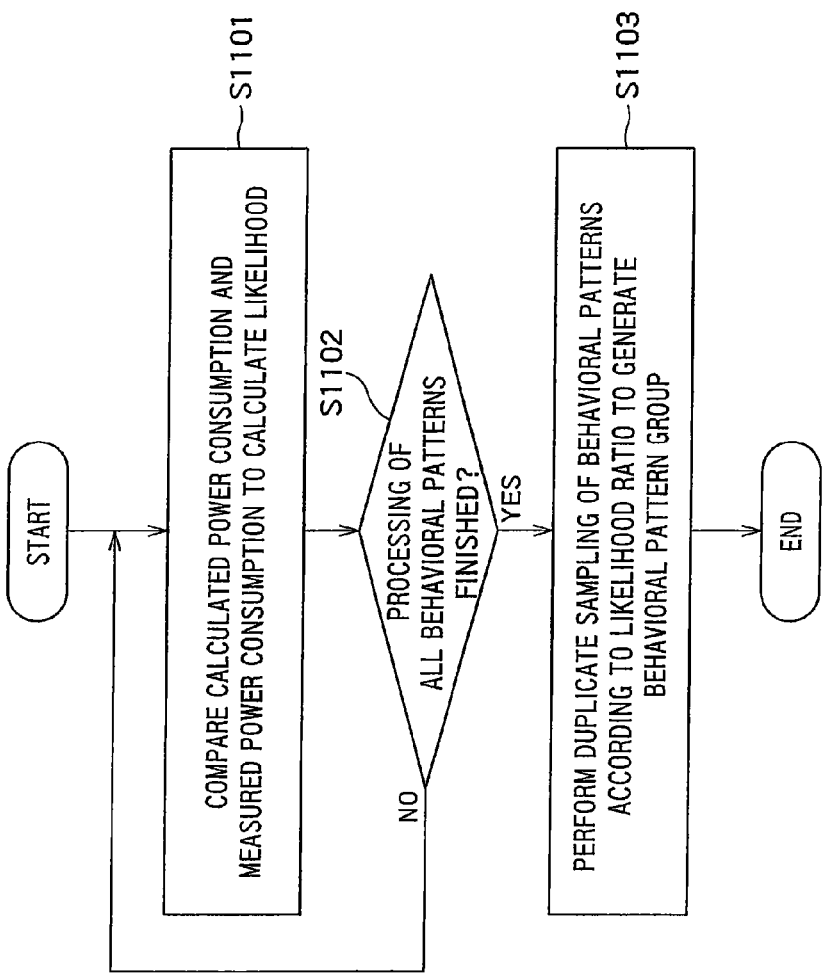
FIG. 11 shows one example of processing procedures in a behavioral pattern evaluation selector.

FIG. 11 shows one example of processing procedures in the behavioral pattern evaluation selector 110 of FIG. 1.

Upon execution of Step S204 of FIG. 2, Step S1101 of FIG. 11 is executed.

Figures 12, 13:
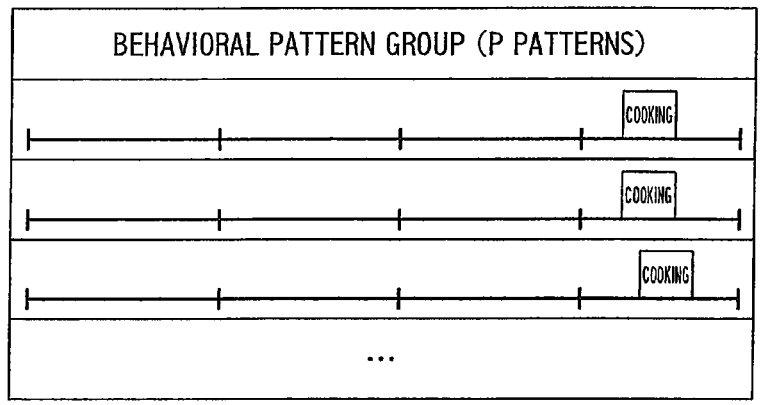
FIG. 12 shows one example of a likelihood function.
FIG. 13 shows one example of behavioral pattern groups generated by a behavioral pattern evaluator.

In Step S1101, a power consumption value calculated in the power consumption calculator 107 and an actual power consumption value stored in the power consumption history storage 109 are given to a likelihood function to calculate a likelihood indicating similarity in power consumption. This calculation is performed for each of "S" behavioral patterns. FIG. 12 shows an example of the likelihood function. A probability according to difference between calculated power consumption and actually measured power consumption is obtained for every time period based on a probability distribution such as a normal distribution. The probability obtained for every time period is multiplied to calculate a likelihood "L". As parameters (average value of a normal distribution, etc.) for the probability distribution such as a normal distribution, pre-tuned values are given to an unshown data base.

In Step S1102, the flow returns to Step S1101 to repeat calculation until the likelihood is calculated for all the behavioral patterns ("S" patterns).

In Step S1103, the likelihood calculated for every behavioral pattern is dividing by the sum of all the likelihoods to calculate a likelihood ratio. For example, assume that "S" behavioral patterns are defined as behavioral patterns 1 to "S", and the likelihood of the behavioral patterns 1 to "S" are defined as likelihoods "L1" to "LS". In this case, a likelihood ratio of the behavioral pattern 1 is L1/(L1+L2+ . . . ; LS), and a likelihood ratio of the behavioral pattern "S" is LS/(L1+L2+ . . . ; LS).

With the obtained likelihood ratio as a weight (probability), "P" behavioral patterns are selected by duplicate sampling from "S" behavioral patterns, and these selected patterns are obtained as one behavioral pattern group. More specifically, duplicate sampling of behavioral patterns is performed "P" times on the assumption that a probability of each behavioral pattern to be selected is equal to each of their obtained likelihood ratios. FIG. 13 shows an example of the generated behavioral pattern group. As described before, a plurality of actions other than the cooking action are placed in actuality.

Figure 14:
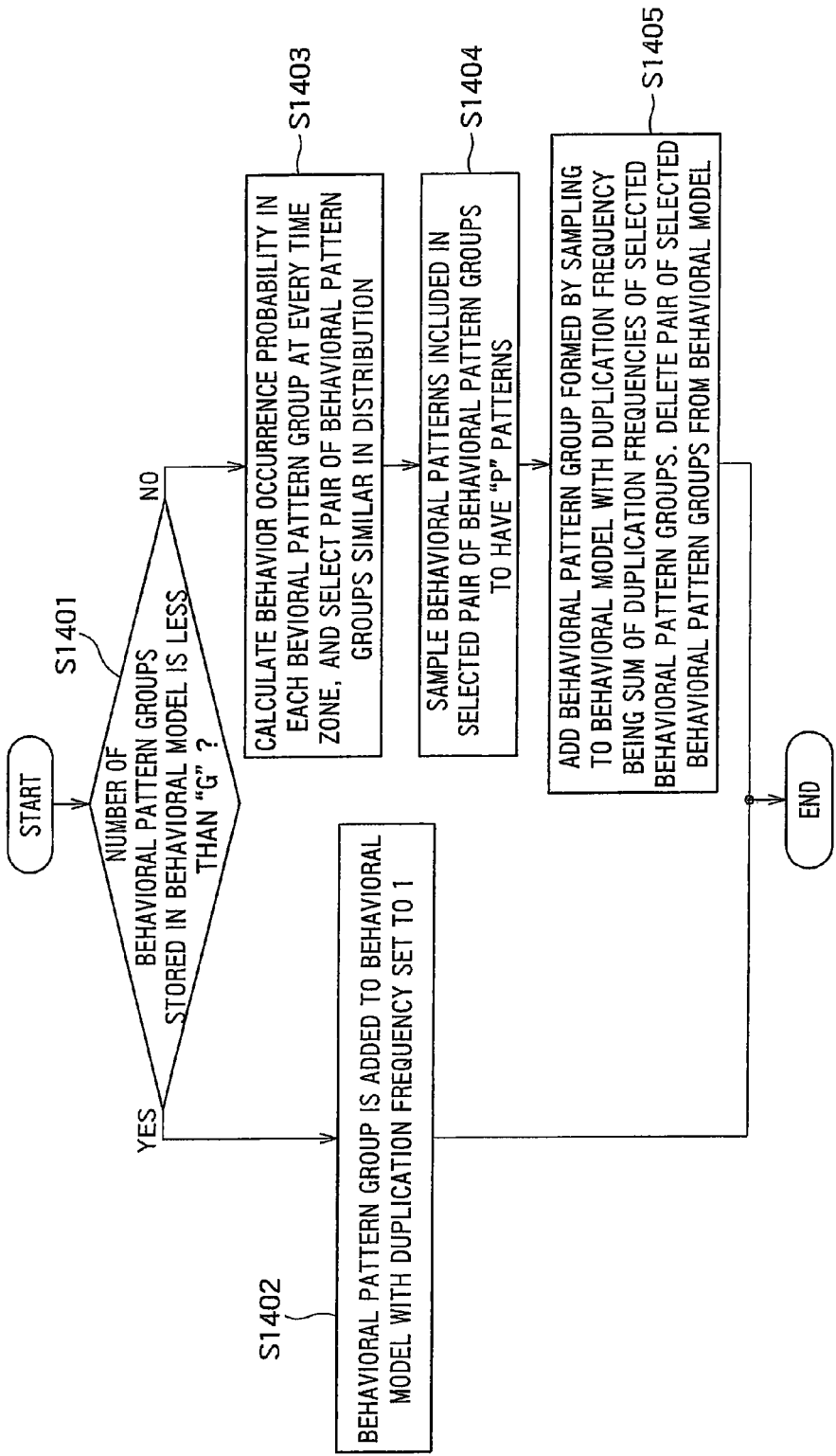
FIG. 14 shows one example of processing procedures in a behavioral model updater.

FIG. 14 shows one example of processing procedures in the behavioral model updater 111 of FIG. 1.

Upon execution of Step S205 of FIG. 2, Step S1401 of FIG. 14 is executed. In Step S1401, if the number of the behavioral pattern groups stored in the behavioral model storage 102 is less than "G", the flow branches to Step S1402, whereas if the number is equal to "G", the flow branches to S1403.

In Step S1402, since the number of the behavioral pattern groups stored in the behavioral model storage 102 has room to increase, a behavioral pattern group generated in the behavioral pattern evaluation selector 110 is added to the behavioral model storage 102 with the duplication frequency being set to 1.

Figure 15:
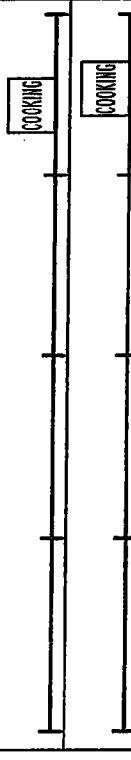
FIG. 15 shows "G+1" behavioral pattern groups obtained by adding a behavioral pattern group to a behavioral model.

In Step S1403, a behavioral pattern group generated in the behavioral pattern evaluation selector 110 is first added to the behavioral model storage 102 temporarily. FIG. 15 shows a behavioral pattern group added to the behavioral model storage 102.

Figure 16:
FIG. 16 shows one example of a behavior occurrence probability at every time zone.

Next, "G+1" behavioral pattern groups stored in the behavioral model storage 102 are converted into behavior occurrence probabilities for every time period (every time zone). For example, a conversion example of one behavioral pattern is as shown below. That is, in one behavioral pattern group, the number of behavioral patterns including cooking action at certain time is obtained. The obtained number is then divided by the number of behavioral patterns included in the one behavioral pattern group to obtain a behavior occurrence probability. This calculation processing is performed at all time. If the behavioral patterns include actions other than cooking action, the calculation processing is also performed for these actions. This calculation processing is also applied to other behavioral pattern groups. FIG. 16 shows an example of the behavior occurrence probability at every calculated time (every time zone).

Next, out of "G+1" behavioral pattern groups, a pair of behavioral pattern groups most similar in distribution of the behavior occurrence probability is selected. For example, a parameter such as Euclidean distance is used as the similarity between distributions. In actuality, since a plurality of actions are placed, Euclidean distance is calculated for every action, and calculated distances are totaled to calculate the similarity.

In Step S1404, total "2P" behavioral patterns included in the selected pair of behavioral pattern groups are subjected to sampling and "P" behavioral patterns are selected. In short, the selected pair of behavioral pattern groups can thus be merged. As a sampling method, arbitrary methods may be used. Some examples will be shown below.

First, "P" behavioral patterns are selected at random.

Secondly, sampling may be conducted according to the duplication frequency of each behavioral pattern group. In this case, behavioral patterns may be selected so that with respective duplication frequencies of two behavioral pattern groups being used as a weight of behavioral patterns, the number of patterns to be selected is in proportion to their weight (probability). Sampling may be the type which does not allow selection of the same behavioral pattern or may be duplicate sampling which allows selection of the same behavioral pattern.

Thirdly, behavioral patterns may be selected such that out of two behavioral pattern groups, behavioral patterns which belong to a newer behavioral pattern group have a higher probability of being selected.

Figure 17:
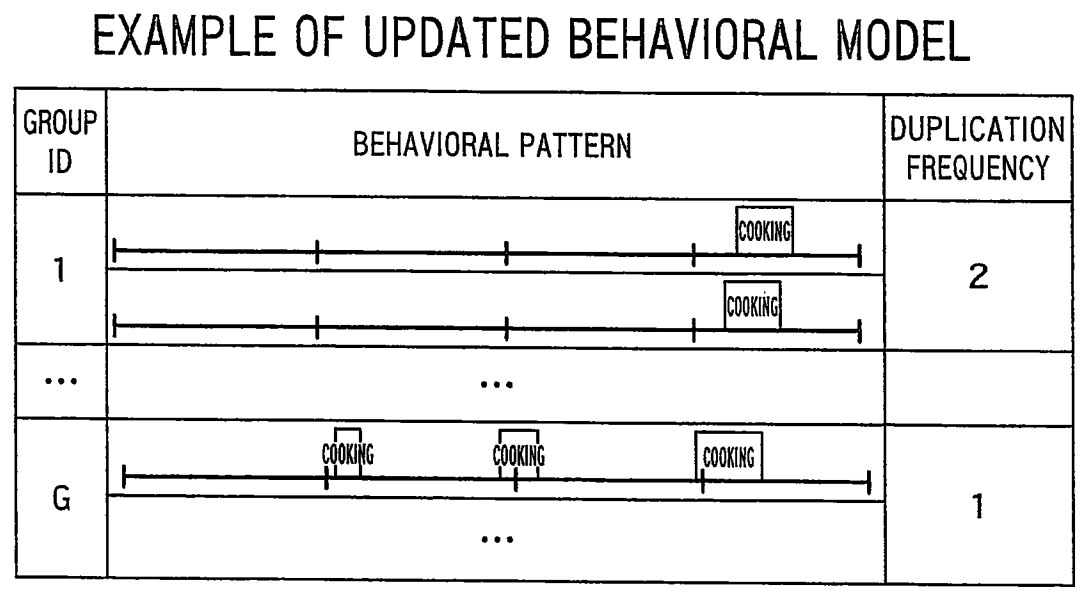

In Step S1405, sampled "P" behavioral patterns are grouped as a new behavioral pattern group (second behavioral pattern group), and a duplication frequency thereof is set as a sum of the respective duplication frequencies of the pair of the selected behavioral pattern groups. This new behavioral pattern group and the duplication frequency thereof are added to the behavioral model storage 102. Two behavioral pattern groups stored in the behavioral model storage 102 before merging are deleted from the behavioral model storage 102. FIG. 17 shows an example of the updated behavioral model.

Thus, a behavioral pattern having power consumption close to actually measured power consumption is obtained as a behavioral model. This makes it possible to obtain a highly reliable behavioral model. It is not necessary to collect information on consumer behavior by surveys such as questionnaire surveys for improvement of precision as conducted conventionally. Without the necessity of information collection by questionnaire surveys and the like, a behavioral pattern composed of actual behavior of a customer or close thereto can be obtained. A behavioral model can be improved not by costly methods such as questionnaire surveys but by using power consumption information measured every day, and thereby improvement in calculation precision of power consumption can be achieved.

Moreover, by repeatedly updating the behavioral model by the above-stated method, patterns having the same behavioral tendency are stored in each group in the behavioral model. For example, assume the case where there are two pattern groups for one office worker who lives alone, it can be considered that one group tends to be a group of weekday behavioral patterns and the other group tends to be a group of holiday behavioral patterns. Analyzing the behavioral patterns in the holiday group is useful in consumer behavior prediction and in measures against power consumption on holiday.

To know an average daily power consumption in a consumer house, duplicate sampling of a plurality of behavioral patterns from a behavioral model may be performed by using the behavioral pattern generator, device operation patterns may be generated in the device operation pattern generator, power consumption may be calculated in the power consumption calculator, and an average thereof may be calculated. In the case where power consumption is measured by 10:00 a.m., and prediction of subsequent power consumption and behavior is desired, a behavioral pattern and power consumption thereby which are most similar to the transition of power consumption by 10:00 a.m. may be picked up based on the behavioral patterns obtained by duplicate sampling and the power consumption calculated thereby.

Each of the groups in the behavioral model may be labeled by a consumer. For example, labels such as weekday and holiday may be attached to the groups. Collecting such behavioral models from each consumer via a network makes it possible to facilitate behavioral surveys without conducting questionnaire surveys.

In addition to the above stated methods, various other methods for utilizing behavioral models may be applied, and therefore the above-stated examples are not exhaustive but illustrative only.

Figure 19:
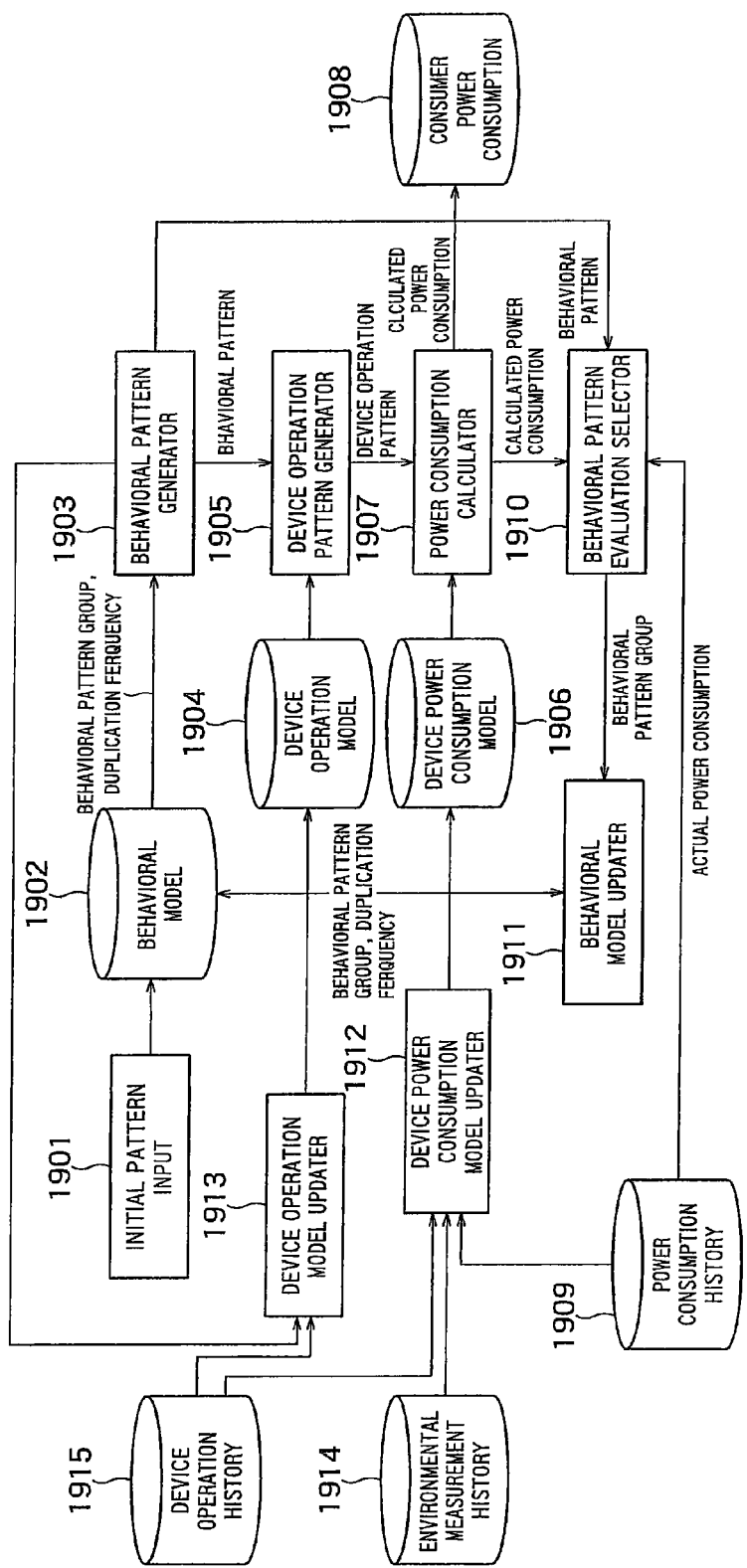
FIG. 19 shows a consumer power consumption calculator according to a second embodiment.

FIG. 19 shows a consumer power consumption calculator according to a second embodiment. As shown in FIG. 19, a device power consumption model updater 1912, a device operation model updater 1913, an environmental measurement history storage 1914, and a device operation history storage 1915 that stores a device operation history are added as compared with the first embodiment. Other blocks, which are similar to those in the first embodiment, are newly numbered, though redundant description thereof will be omitted.

The environmental measurement history storage 1914 stores an environmental measurement history that is a history of outdoor and indoor sensing information such as outdoor temperature and indoor temperature. The environmental measurement history is used in the device power consumption model updater 1912.

The device operation history storage 1915 stores a device operation history that is a history of the information indicating operations of devices or states of devices, such as ON/OFF operation of a device and a cooling temperature operation of a device. The device operation history is used in the device power consumption model updater 1912 and in the device operation model updater 1913.

The power consumption history storage 1909 stores transition data on entire power consumption in a consumer house (power consumption of a plurality of devices) as well as transition data on power consumption of individual devices, which can be measured by smart electric sockets and the like, as a power consumption history.

The device power consumption model updater 1912 updates a device power consumption model in the device power consumption model 106 with use of the power consumption history in the power consumption history storage 1909 and the above-stated environmental measurement history and device operation history.

The device operation model updater 1913 updates a device operation models in the device operation model 1904 with use of the behavioral patterns generated in the behavioral pattern generator 1903 and the above device operation history.

Figure 20:
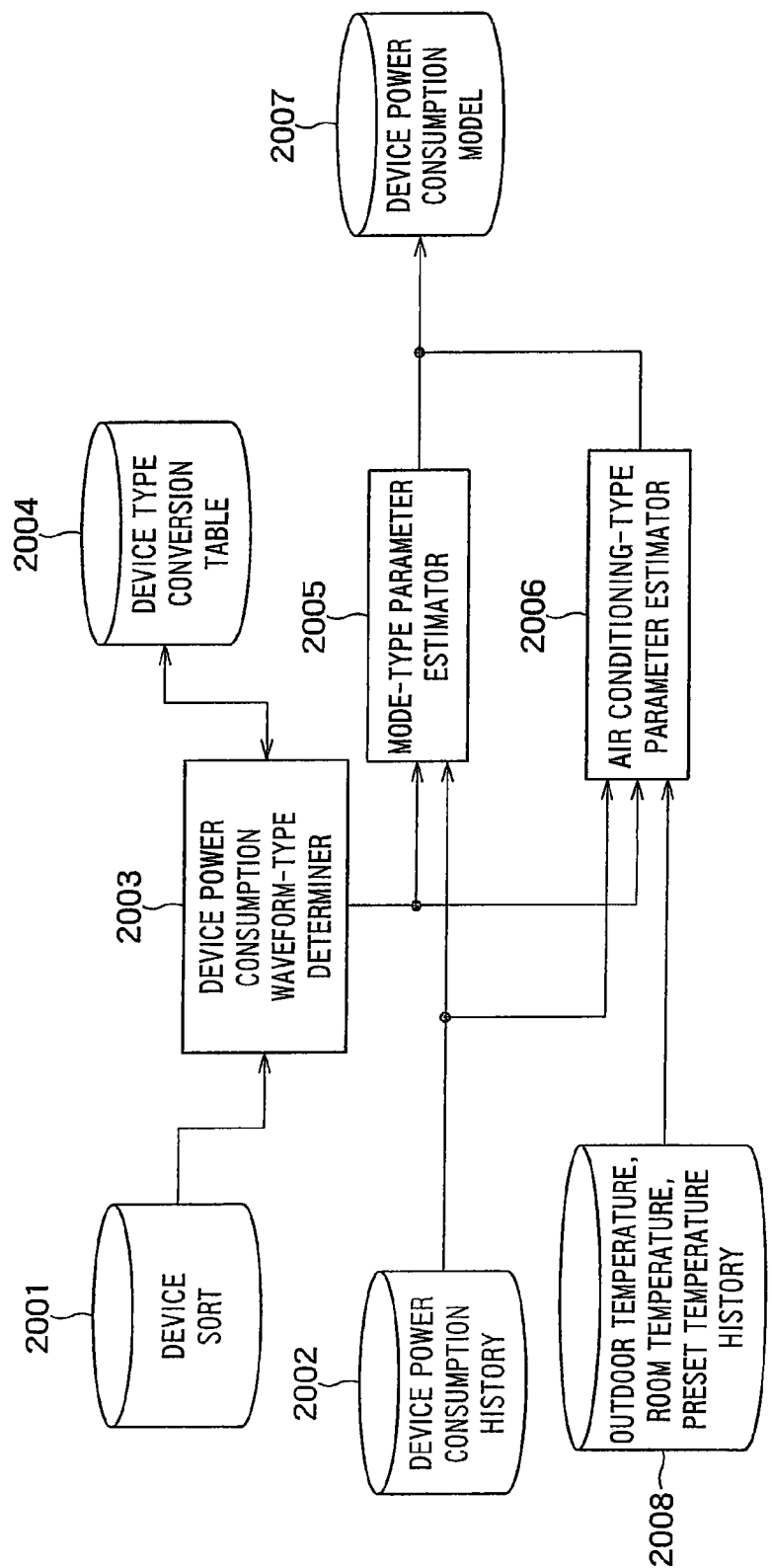
FIG. 20 shows a configuration example of a device power consumption model updater.

The device power consumption model updater 1912 includes, as shown in FIG. 20, a device sort storage 2001, a device power consumption history storage 2002, a device power consumption waveform-type determiner 2003, a device type conversion table 2004, a mode-type parameter estimator 2005, an air conditioning-type parameter estimator 2006, a device power consumption model storage 2007, and an outdoor temperature/room temperature/preset temperature history 2008. The device power consumption model storage 2007 corresponds to the device power consumption model 1906 of FIG. 19. Here, the device power consumption model storage 2007 is assumed to be provided in the device power consumption model updater 1912.

The outdoor temperature/room temperature/preset temperature history storage 2008 represents outdoor temperature information, room temperature information, and preset temperature information among the information stored in the environmental measurement history storage 1914 and the device operation history storage 1915 shown in FIG. 19. The outdoor temperature/room temperature/preset temperature history storage 2008 may read such information from the storages 1914 and 1915 and store them, or the outdoor temperature/room temperature/preset temperature history storages 2008 may be a part of the storages 1914 and 1915.

Figures 21, 22, 23:
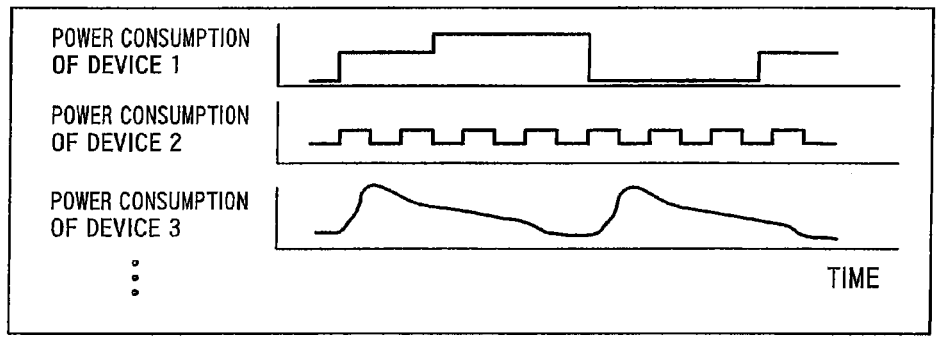
FIG. 21 shows one example of device sorts.
FIG. 22 shows an example of a device power consumption history.
FIG. 23 shows an example of a device type conversion table.

The device sort storage 2001 stores information indicating sorts of respective devices, such as an air conditioner and a TV. FIG. 21 shows an example of device sorts. Device sorts, such as a washer/dryer, a refrigerator, and an air conditioner, are defined for every device. The device sort storage 2001 is used in the device power consumption waveform-type determiner 2003.

The device power consumption history storage 2002, which is configured to store a history of power consumption in each device, constitutes a part of the power consumption history 1909. The device power consumption history 2002 is used in the mode-type parameter estimator 2005 and in the air conditioning-type parameter estimator 2006. FIG. 22 shows an example of the device power consumption history. Data may be collected from sensors which measure power consumption in each device.

The device type conversion table 2004 stores the relationship between the device sort and the device type such as a mode type and an air conditioning type (waveform type). FIG. 23 shows an example of the device type conversion table 2004. The device type conversion table 2004 is used in the device power consumption waveform-type determiner 2003. FIG. 23 shows an example of the device type conversion table 2004.

The device power consumption waveform-type determiner 2003 uses device sorts and the device type conversion table 2004 to specify a device type (such as a mode type and an air conditioning type) of each device based on its device sort. The device power consumption waveform-type determiner 2003 determine which to use, the mode-type parameter estimator 2005 or the air conditioning-type parameter estimator 2006, for device consumption model parameter estimation of each device, according to the device type (waveform type) of each device.

In the case of a mode-type device, it is determined to perform the parameter estimation of the device with the mode-type parameter estimator 2005. In the case of an air conditioning-type device, it is determined to perform the parameter estimation of the device with the air conditioning-type parameter estimator 2006.

Examples of the mode-type device include, for example, those regularly in ON state (regular ON device) such as a refrigerator and those capable of switching ON/OFF states (ON/OFF device) such as a washer/dryer. Further, the ON/OFF devices can include a plurality of modes different in power consumption even in ON state. For example, the dryer/washer includes a plurality of modes different in power consumption in ON state, such as a washing mode, a rinse mode, and a dry mode.

The mode-type parameter estimator 2005 uses the device power consumption history to estimate model parameters of a mode-type device, and to update the device power consumption model of the device in the device consumption model storage 2007 (1906).

The air conditioning-type parameter estimator 2006 uses the device power consumption history and the outdoor temperature/room temperature/preset temperature history to estimate model parameters of an air conditioning-type device, and updates the device power consumption model of the device in the device consumption model storage 2007 (1906) with the estimated parameter.

Figure 24:
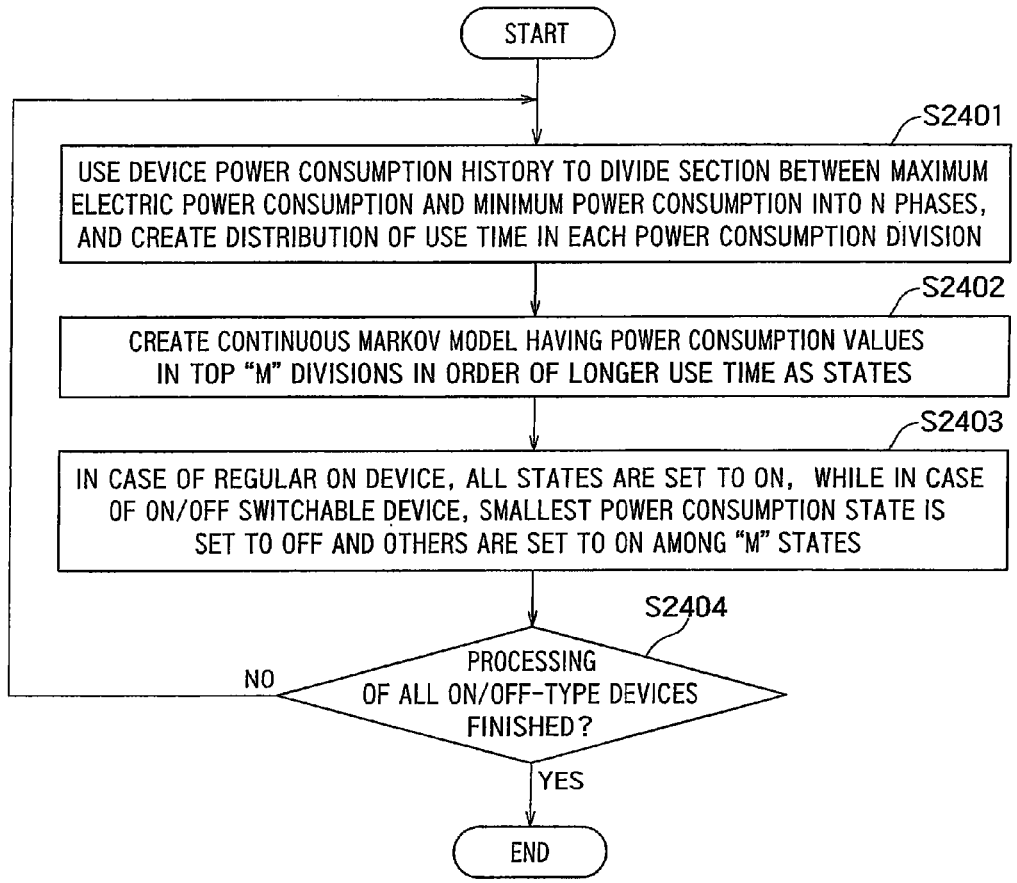
FIG. 24 shows one example of processing procedures in a mode-type parameter estimator.

FIG. 24 shows one example of processing procedures in the mode-type parameter estimator 2005 of FIG. 20.

Figure 25:
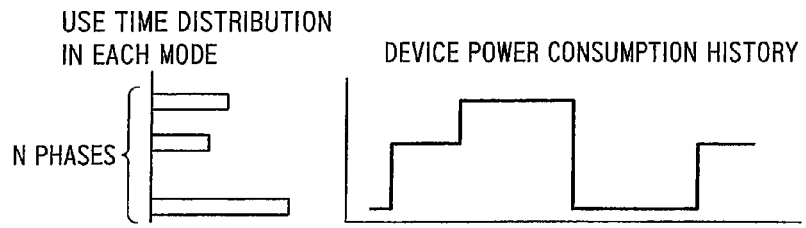
FIG. 25 shows an example of a use time distribution and an example of a device power consumption history.

In Step S2401, a device power consumption history of a target device is used to divide a section between maximum electric power consumption and minimum power consumption of the device into N phases, and a distribution of use time in each phase (power consumption division) is created. FIG. 25 shows an example of the use time distribution on the left-hand side and an example of the device power consumption history on the right-hand side.

In Step S2402, created is a continuous Markov model having power consumption values of top "M" divisions in the order of longer use time, among "N" phase divisions created in Step S2401, as states. For example, as a power consumption value in a phase, a representative value, such as an average value or a central value in the phase, may be used. The continuous Markov model includes an inter-state transition probability "Pij" and an average stay time "Ti" in each state. It may also include a power consumption value in each phase. An example of the continuous Markov model is shown in FIG. 26 as mentioned above. It is to be noted that a parameter "M" to be selected may be a fixed value such as 10, may be a ratio such as N/2, or may represent all the divisions (phases) where use time is not equal to 0.

In Step S2403, all the states are set to ON in the case of the regular ON device (such as a refrigerator). In the case of the ON/OFF switchable device (such as a dryer/washer), the smallest power consumption state is set to OFF and others are set to ON among "M" states. Such setting makes it possible to determine an initial state required in calculating the power consumption of device. For example, in the case of the ON/OFF device, OFF is set as an initial state, while in the case of the regular ON device, the state 1 may be set as an initial state, or the initial state may be determined at random.

In Step S2404, the flow returns to S2401 to repeat the processing until all the mode-type devices are finished.

Figure 27:
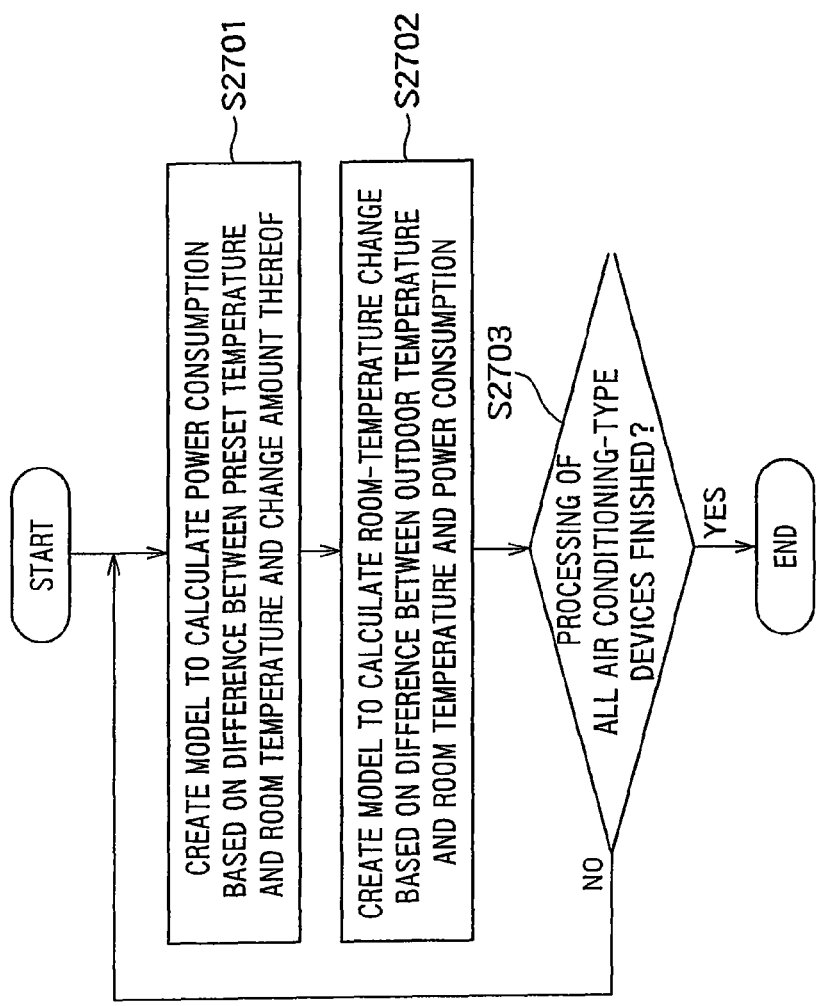
FIG. 27 shows one example of processing procedures in an air conditioning-type parameter estimator.

FIG. 27 shows one example of processing procedures in the air conditioning-type parameter estimator 2006 of FIG. 20.

In Step S2701, based on the past preset temperature history, room-temperature history, and power consumption history of a target device, difference between preset temperature and room temperature and change amount in the difference (i.e., difference from a value one time period earlier) are divided into fixed divisions, respectively, and an average power consumption value is calculated for every combination of the divisions to estimate a power consumption calculation model. FIG. 28 shows an example of the power consumption calculation model.

In Step S2702, based on the past power consumption history and difference between outdoor temperature and room temperature, an average room temperature change amount is calculated for every constant division to estimate a room-temperature change calculation model, respectively. FIG. 29 shows an example of the room-temperature change calculation model.

In Step S2703, the flow returns to S2701 to repeat the processing until all the air conditioning-type devices are finished.

Figure 30:
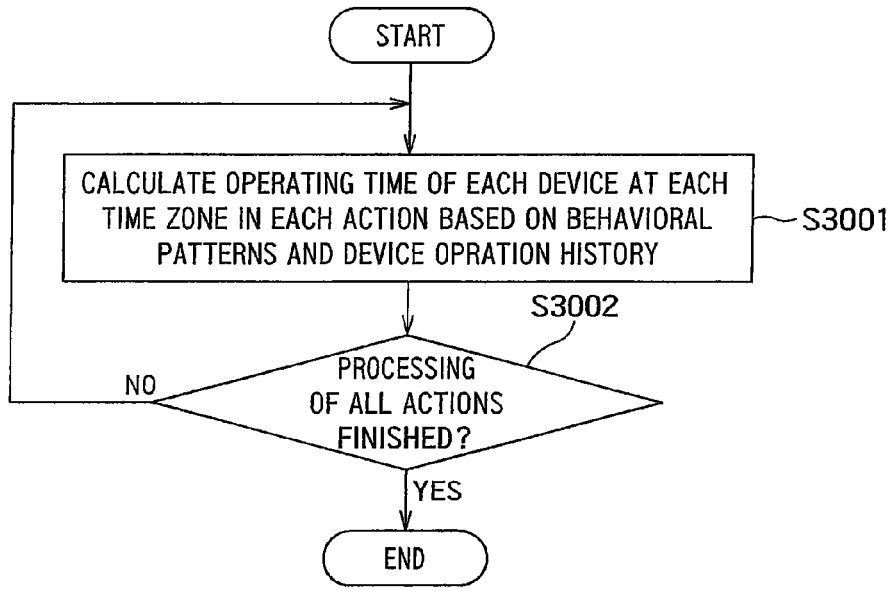
FIG. 30 shows one example of processing procedures in a device operation model updater.

FIG. 30 shows an example of processing procedures in the device operation model updater 1913 of FIG. 19.

Figure 31:
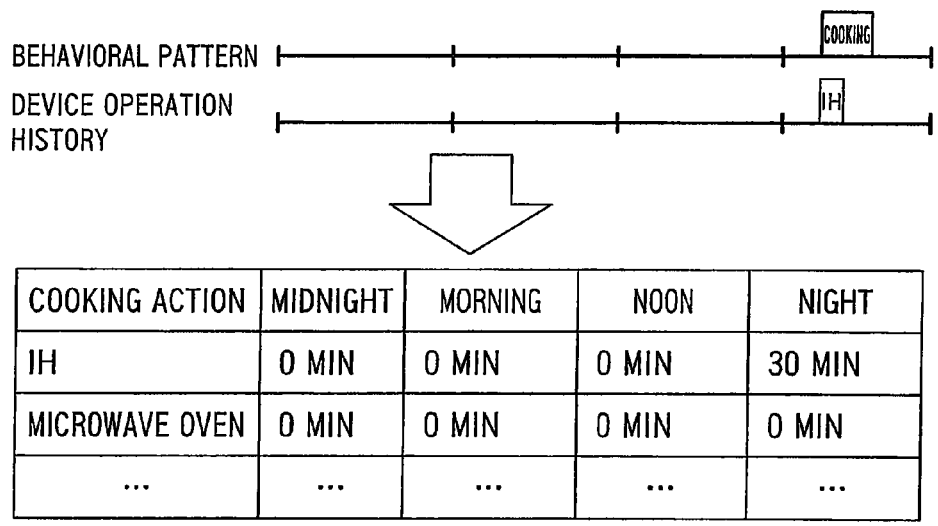
FIG. 31 shows a calculation example of the device operation model.

In Step S3001, operating time of a device in each action time is calculated for every action at every time zone based on behavioral patterns. As a value of each time zone, an average value may be used for example. FIG. 31 shows an example of the calculation result. As the behavioral patterns, those generated in the operation of FIG. 3 in the first embodiment may be used. Or alternatively, behavioral patterns may be generated by independent operation different from that of the first embodiment. If a device operation history and a behavioral pattern are data obtained at the same time, they can be used without any problem.

In Step S3002, the flow returns to S3001 to repeat the processing until all the actions are finished.

FIG. 32 and the following formula show an example of a likelihood function used in Step S1101 of FIG. 11 when update of the device power consumption model and update of the device operation model are performed. The likelihood function is changed from that in the first embodiment in the point of the method for evaluating devices when power consumption of devices is available.

$$L = \prod_t \left( N(S_t - W_t) \prod_{i \in measuring\ device} N(Q_{it} - V_{it}) \right)$$

$$\prod_{i \in measuring\ device} N(Q_{it} - V_{it})$$

The above term corresponds to a first value being a multiplied value of, among devices, a probability of difference between power consumption "$Q_{it}$" and power consumption "$V_{it}$" where "$Q_{it}$" is power consumption calculated regarding a device model-updated by the device power consumption model updater and "$V_{it}$" is power consumption measured regarding the device, and the probability of difference is obtained according to a probability distribution (normal distribution in this case) which associates the difference with the probability.
ces.

$N(S_t - W_t)$

The above term corresponds to a second value representing a probability of difference between a value "$S_t$" and a value "$W_t$" where "$S_t$" is the calculated power consumption of a consumer house subtracted by the calculated power consumption of the model-updated device(s), "$W_t$" is the measured power consumption subtracted by the measured power consumption of the model-updated device(s), the probability of difference is obtained according to a probability distribution (normal distribution in this case) which associates the difference with the probability.

These first value and second value are multiplied for every time period, and these resultant values at the respective time are further multiplied to calculate a likelihood "L".

Figure 33:
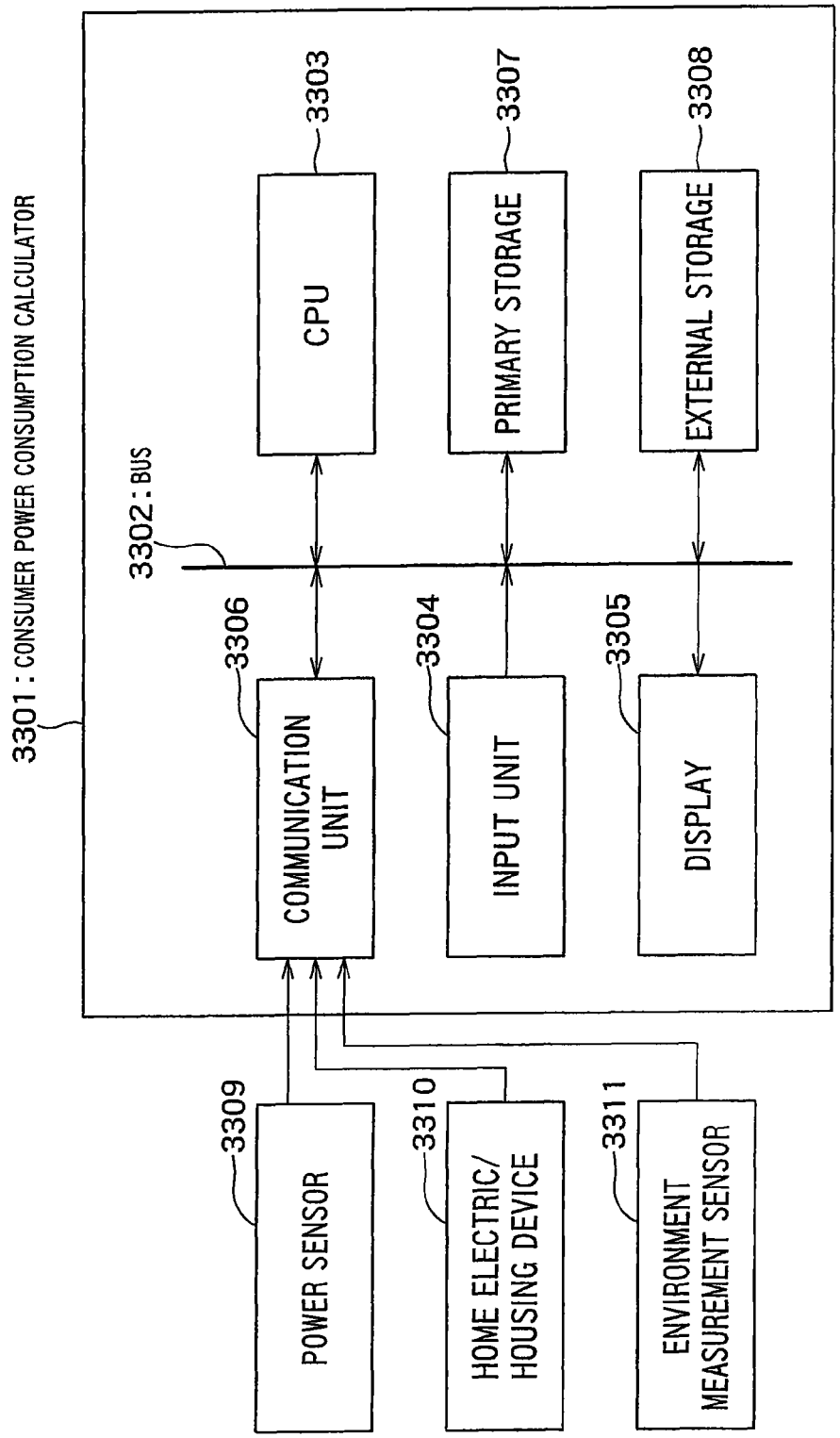
FIG. 33 shows another hardware configuration of the consumer power consumption calculator.

FIG. 33 shows a hardware configuration example of the consumer power consumption calculator in the case where update of the device power consumption model and update of the device operation model are performed. As compared with the first embodiment, a home electric/housing device 3310, and an environmental measurement sensor 3311 are added. Other components, which are similar to those in FIG. 19, are newly numbered though redundant description thereof will be omitted.

The consumer power consumption calculator is connected to the home electric/housing device 3310 via a network. In a communication unit 3306, operation information on each device, such as cooling temperature, is obtained from the home electric/housing device 3310. The obtained operation information is used in the device power consumption model updater 1912 and in the device operation model updater 1911.

The consumer power consumption calculator is connected to the environmental measurement sensor 3311 via a network. The environmental measurement sensor 3311 measures indoor and outdoor environmental information such as outdoor temperature and indoor temperature. The measured environmental information is received in the communication unit 3306 and is used in the device power consumption model updater 1912. When required in the model, information on a resident, such as detectable human body information, may be measured.

The invention claimed is:

1. A behavioral model generating device, comprising;
at least one memory configured to store a plurality of behavioral pattern groups and weighting factors set for the behavioral pattern groups, the behavioral pattern groups each including a plurality of behavioral patterns that indicate consumer actions placed along with time;
a processor configured to
select, according to the weighting factors, a plurality of behavioral patterns from all the behavioral patterns included in the behavioral pattern groups by duplicate sampling, and to add modification to each of selected behavioral patterns to generate a plurality of first behavioral patterns;
generate, based on the first behavioral patterns, device operation patterns that indicate device operations placed along with time according to a device operation model that defines correspondence between actions and device operations;
calculate power consumption data for each of the device operation patterns, which indicate temporal transition of power consumption, according to a device power consumption model that defines correspondence between device operations and power consumption, wherein
the at least one memory stores measured power consumption data that indicates temporal transition of power consumption by one or more devices in a consumer house,
the processor is further configured to
calculate a likelihood of each calculated power consumption data with respect to measured power consumption data, respectively, and to select, according to the likelihood, a plurality of behavioral patterns from the first behavioral patterns by duplicate sampling as a first behavioral pattern group, and
select a pair of most similar behavioral pattern groups from all the behavioral pattern groups including the first behavioral pattern group and to select a part of all the behavioral patterns included in the pair as a second behavioral pattern group, to update the pair of the most similar behavioral pattern groups with the second behavioral pattern group, and to set a weighting factor of the second behavioral pattern group to a sum of respective weighting factors of the pair of the most similar behavioral pattern groups.

2. The generator according to claim 1, wherein
the processor calculates an occurrence probability distribution of actions for each of all the behavioral pattern groups, calculates a distance between occurrence probability distributions of two behavioral pattern groups, and selects two behavioral pattern groups with the distance being smallest as the pair of the most similar behavioral pattern groups.

3. The generator according to claim 1, wherein
the processor obtains a probability of difference between the calculated power consumption data and the measured power consumption data for each of times according to a probability distribution representing relationship between the difference and the probability and multiplies the probability among the times to thereby obtain the likelihood.

4. The generator according to claim 1, wherein
the processor generates the first behavioral patterns by changing a position or time of an action included in the behavioral patterns, deleting the action or changing the action or adding an action.

5. The generator according to claim 1,
wherein the at least one memory stores the power consumption data.

6. The generator according to claim 1, wherein
the at least one memory stores an operation history of the device, and
the processor generates a first device operation model based on the first behavioral patterns and the operation history of the device and to update the device operation model of the device with the first device operation model.

7. The behavioral model generating device according to claim 6, wherein
the processor generates, based on actions placed in the first behavioral patterns and operation times of the device operated by the actions, the first device operation model that defines correspondence between the actions and the operation times of the device.

8. The generator according to claim 1, wherein
the at least one memory stores a history of temporal transition data on measured power consumption of the device, and
the processor generates a first device power consumption model of the device based on the history stored in the at least one memory and updates the device power consumption model of the device with the first device power consumption model.

9. The generator according to claim 8, wherein
the processor divides a section between a maximum value and a minimum value of measured power consumption of the device into a plurality of divisions to create a distribution of stay time in each division, and generates a continuous Markov model including a representative power consumption of each of the divisions, transition probabilities between states corresponding to the divisions, and average stay times in the states as the device power consumption model.

10. The generator according to claim 8, wherein
the at least one memory stores a preset temperature history of the device, a room-temperature history of a room where the device is placed, and an outdoor temperature history of the consumer house, wherein
the processor
calculates, based on first different ranges representing difference between a preset temperature and a room temperature and second different ranges representing difference between a value of the former difference and a value thereof one time period earlier, an average power consumption for each combination of the first range and the second range to thereby estimate the first power consumption calculation model, and
calculates an average room temperature change amount for each different range representing power consumption in the history of temporal transition data on measured power consumption of the device and for each different range representing difference between outdoor temperature and room temperature to thereby calculate a room-temperature change calculation model, wherein
a pair of the power consumption calculation model and the room-temperature change calculation model corresponds to the device power consumption model.

11. The behavioral model generating device according to claim 8, wherein
the processor calculates a multiplication value of a first value and a second value for each of times and multiplies a multiplied value among the times to obtain the likelihood,
the first value being a multiplication value of, among the devices, a probability of difference between power consumption calculated regarding the device model-updated by the processor and power consumption measured regarding the device, the probability of difference being obtained according to a probability distribution between the difference and the probability; and
the second value being a probability of difference between the power consumption data subtracted by the calculated power consumption of the device and the measured power consumption data subtracted by the measured power consumption of the device, the probability of difference being obtained according to a probability distribution between the difference and the probability.

12. A behavioral model generating method, comprising;
reading data from at least one memory configured to store a plurality of behavioral pattern groups and weighting factors set for the behavioral pattern groups, the behavioral pattern groups each including a plurality of behavioral patterns that indicate consumer actions placed along with time;
selecting, via a processor and according to the weighting factors, a plurality of behavioral patterns from all the behavioral patterns included in the behavioral pattern groups by duplicate sampling;
adding, via the processor, modification to each of selected behavioral patterns to generate a plurality of first behavioral patterns;
generating, via the processor and based on the first behavioral patterns, device operation patterns that indicate device operations placed along with time according to a device operation model that defines correspondence between actions and device operations;
calculating, via the processor, power consumption data for each of the device operation patterns, which indicate temporal transition of power consumption according to a device power consumption model that defines correspondence between device operations and power consumption;
reading data from the at least one memory configured to store measured power consumption data that indicates temporal transition of power consumption by one or more devices in a consumer house;
calculating, via the processor, a likelihood of each calculated power consumption data with respect to measured power consumption data, respectively, and selecting, according to the likelihood, a plurality of behavioral patterns from the first behavioral patterns by duplicate sampling as a first behavioral pattern group;
selecting, via the processor, a pair of most similar behavioral pattern groups from all the behavioral pattern groups including the first behavioral pattern group;
selecting, via the processor, a part of all the behavioral patterns included in the pair as a second behavioral pattern group;
updating, via the processor, the pair of the most similar behavioral pattern groups with the second behavioral pattern group; and
setting, via the processor, a weighting factor of the second behavioral pattern group to a sum of respective weighting factors of the pair of the most similar behavioral pattern groups.

13. A non-transitory computer-readable medium storing thereon computer-readable instructions which when executed by a computer cause the computer to execute a behavioral model generating method, comprising;
reading data from at least one memory configured to store a plurality of behavioral pattern groups and weighting factors set for the behavioral pattern groups, the behavioral pattern groups each including a plurality of behavioral patterns that indicate consumer actions placed along with time;
selecting, according to the weighting factors, a plurality of behavioral patterns from all the behavioral patterns included in the behavioral pattern groups by duplicate sampling;
adding modification to each of selected behavioral patterns to generate a plurality of first behavioral patterns;
generating, based on the first behavioral patterns, device operation patterns that indicate device operations placed along with time according to a device operation model that defines correspondence between actions and device operations;
calculating power consumption data for each of the device operation patterns, which indicate temporal transition of power consumption according to a device power consumption model that defines correspondence between device operations and power consumption;
reading data from the at least one memory configured to store measured power consumption data that indicates temporal transition of power consumption by one or more devices in a consumer house;
calculating a likelihood of each calculated power consumption data with respect to measured power consumption data, respectively, and selecting, according to the likelihood, a plurality of behavioral patterns from the first behavioral patterns by duplicate sampling as a first behavioral pattern group;
selecting a pair of most similar behavioral pattern groups from all the behavioral pattern groups including the first behavioral pattern group;
selecting a part of all the behavioral patterns included in the pair as a second behavioral pattern group;
updating the pair of the most similar behavioral pattern groups with the second behavioral pattern group; and
setting a weighting factor of the second behavioral pattern group to a sum of respective weighting factors of the pair of the most similar behavioral pattern groups.

* * * * *